US007066399B2

(12) United States Patent
Hohl

(10) Patent No.: US 7,066,399 B2
(45) Date of Patent: Jun. 27, 2006

(54) FUEL INJECTOR

(75) Inventor: Günther Hohl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/433,347

(22) PCT Filed: Aug. 22, 2002

(86) PCT No.: PCT/DE02/03070

§ 371 (c)(1),
(2), (4) Date: Nov. 20, 2003

(87) PCT Pub. No.: WO03/031799

PCT Pub. Date: Apr. 17, 2003

(65) Prior Publication Data

US 2004/0079815 A1 Apr. 29, 2004

(30) Foreign Application Priority Data

Oct. 2, 2001 (DE) ................................ 101 48 594

(51) Int. Cl.
*B05B 1/08* (2006.01)
*F02M 59/00* (2006.01)
*F16K 31/00* (2006.01)

(52) U.S. Cl. ............................... 239/102.2; 239/533.2; 239/533.7; 239/533.9; 251/335.3; 251/129.06; 251/54

(58) Field of Classification Search ............. 239/102.2, 239/584, 453, 533.7, 533.9, 533.4; 251/57, 251/129.06, 54, 335.3
See application file for complete search history.

(56) References Cited

U.S. PATENT DOCUMENTS

| | | | | |
|---|---|---|---|---|
| 4,858,439 | A * | 8/1989 | Sawada et al. | 60/583 |
| 6,311,950 | B1 * | 11/2001 | Kappel et al. | 251/129.06 |
| 6,427,968 | B1 * | 8/2002 | Stoecklein | 251/57 |
| 6,685,105 | B1 * | 2/2004 | Ruehle et al. | 239/102.1 |
| 6,712,289 | B1 * | 3/2004 | Ruehle et al. | 239/102.2 |
| 6,719,264 | B1 * | 4/2004 | Mattes | 251/57 |

FOREIGN PATENT DOCUMENTS

| | | |
|---|---|---|
| DE | 199 50 760 | 4/2001 |
| DE | 199 54 537 | 5/2001 |
| DE | 199 58 704 | 6/2001 |
| DE | 199 62 177 | 7/2001 |
| DE | 199 63 568 | 7/2001 |
| EP | 0 477 400 | 4/1992 |
| EP | 1 111 230 | 6/2001 |

* cited by examiner

*Primary Examiner*—David A. Scherbel
*Assistant Examiner*—Seth Barney
(74) *Attorney, Agent, or Firm*—Kenyon & Kenyon LLp

(57) ABSTRACT

A fuel injector for fuel-injection systems of internal combustion engines having a piezoelectric or magnetostrictive actuator, includes a hydraulic coupler which actuates a valve-closure member (3) formed on a valve needle. The valve-closure member cooperates with a valve-seat surface to form a valve-sealing seat. The coupler includes a master piston and a slave piston which are guided in bores of a guide sleeve. Located between the master piston and the slave piston is a pressure chamber filled with a hydraulic fluid. A corrugated tube is positioned around the guide sleeve which is sealingly joined to the master piston at one end and to the slave piston at the other end, and which seals a supply chamber for the hydraulic fluid from a surrounding fuel chamber.

11 Claims, 3 Drawing Sheets

FUEL INJECTOR

FIELD OF THE INVENTION

The present invention relates to a fuel injector.

BACKGROUND INFORMATION

European Patent No. EP 0 477 400 describes a fuel injector having a path transformer for a piezoelectric actuator in which the actuator transmits a lifting force to a master piston. The master piston is in force-locking connection to a guide cylinder for a slave piston. The slave piston, the guide cylinder and the master piston sealing the guide cylinder form a hydraulic chamber. A spring, which presses the master piston and the slave piston apart, is situated in the hydraulic chamber. Surrounding an end section of the guide cylinder and the slave piston is a rubber sleeve by which a supply chamber for a viscous hydraulic fluid is sealed from a fuel chamber. The viscosity of the hydraulic fluid is adapted to the ring gap between the slave piston and the guide cylinder.

The slave piston mechanically transmits a lifting movement to a valve needle, for example. When the actuator transmits a lifting movement to the master piston and the guide cylinder, the pressure of the hydraulic fluid in the hydraulic chamber transmits this lifting movement to the slave piston, since the hydraulic fluid in the hydraulic chamber is not compressible and during the short duration of a lift only a very small portion of the hydraulic fluid is able to escape through the ring gap into the supply chamber formed by the rubber sleeve. In the rest phase, when the actuator does not exert any pressure on the master piston, the spring pushes the slave piston out of the guide cylinder and the hydraulic fluid, due to the generated vacuum pressure, enters and refills the hydraulic chamber via the ring gap. In this way, the path transformer automatically adapts to longitudinal expansions and pressure-related expansions of a fuel injector.

The sealing by a rubber sleeve, which is pressed against the end section of the guide cylinder and the slave piston by two clamping rings, is unsatisfactory in the long term. The highly viscous hydraulic fluid and the fuel thus may mix over time, and the coupler break down. When gasoline, as one possible fuel, reaches the interior of the coupler, a loss of function may occur since this fluid, due to the low viscosity of the gasoline, may rapidly flow through the ring gap and no pressure is able to be generated in the pressure chamber during the brief dynamic lift duration.

SUMMARY

An example fuel injector according to the present invention has the advantage over the related art that the supply chamber is permanently sealed by a corrugated tube. Connections such as welding seams do not lose their sealing effect through material fatigue. By using an hydraulic fluid having high viscosity, relatively large tolerances and, thus, ring gaps may be allowed between the master piston and its guide bore on the one hand, and also the slave piston and its guide bore on the other hand. During the brief duration of a lift, only a small portion of the hydraulic fluid may escape. In the following rest phase, the master piston and slave piston are pushed out of their bores and the hydraulic fluid flows into the pressure chamber via the ring gap. Thermal expansions and expansions of the fuel injector caused by the pressure of the fuel are compensated since the master piston and the slave piston are pressed apart until they come to abut against adjacent components of the lift transmission.

The corrugated tube may be connected to the master piston and the slave piston by force-locking and be provided with an initial stress that pushes the master piston and the slave piston apart.

In an advantageous manner, the corrugated tube simultaneously fulfills the function of a coupler spring, namely of pushing apart the master piston and the slave piston, so that a separate coupler spring may be omitted.

In one advantageous embodiment, the corrugated tube is radially yielding, especially in that the corrugated tube is flexurally soft due to a reduced wall thickness. The supply chamber and the pressure chamber, via the ring gap, thus assume the pressure of the fuel chamber surrounding the corrugated tube. The hydraulic fluid is then pressed through the ring gap in the rest phase, when relatively low pressure is generated in the pressure chamber by the movement of the master piston and the slave piston, the hydraulic fluid filling the pressure chamber.

The master piston and the slave piston may have different diameters, especially the master piston having a larger diameter. A torque support then advantageously braces the guide sleeve in the direction of the slave piston.

This provides the option of using an inexpensive, compact actuator, which does have a high actuating force, yet only short actuator travel for a lift movement. Owing to the lift translation, a sufficient actuator travel is achieved for a valve needle. If the master piston and the slave piston do not have identical diameters, an effective area acting upon the guide sleeve remains in the pressure chamber. When the pressure is increased, a force in the amount of the area difference multiplied by the pressure acts upon the guide sleeve. Therefore, this force must be diverted by a torque support of the guide sleeve. With master piston and slave piston along one axis and a larger diameter of the master piston, the resulting force is oriented in the slave piston's direction of movement.

The torque support advantageously is a support ring connected to the guide sleeve by force locking, which, via a radial convolution of the corrugated tube, abuts against a carrier ring joined to a valve body by force-locking.

Owing to the radial convolution of the corrugated tube, by which a corrugated-tube section is to be understand whose radial cross section is formed in such a way that a wall section of the corrugated tube that lies approximately in the radial plane and has no waviness, the supporting force may be transmitted. This embodiment does not interrupt the corrugated tube and requires no additional sealing connections.

A compression spring, braced against the master piston, may keep the support ring in contact.

The actuator lift may be restricted by a stop and the stop be embodied on an actuator head.

In an advantageous embodiment, the corrugated tube is integrally formed with a corrugated tube for sealing an actuator chamber from a fuel chamber, and the corrugated tube has a reduced wall thickness in the region of the coupler. As a result, less unit volume is required, and the number of parts is able to be reduced.

In one advantageous specific embodiment, a filling channel is provided in the master piston and/or the slave piston, which connects the supply chamber to a surrounding chamber of the coupler, and the filling channel is able to be sealed in a pressure-tight manner by a sealing element.

Furthermore, the filling channel may be implemented in the master piston by filling bores and the supply chamber connected to an actuator chamber, the sealing element being a ball pressed into one of the filling bores.

Advantageous in this embodiment is that it allows a convenient manufacture. The coupler is to be filled with a highly viscous hydraulic fluid. At the same time, it is advantageous if the actuator chamber is filled in a nonpressurized manner with a sliding and cooling fluid. The required characteristics may be provided by a single hydraulic fluid, such as silicon oil. The coupler is easy to fill before the actuator is mounted.

BRIEF DESCRIPTION OF THE DRAWINGS

Exemplary embodiments of the present invention are shown in simplified form in the drawing and are elucidated in greater detail in the following description.

DETAILED DESCRIPTION

Figure 1:
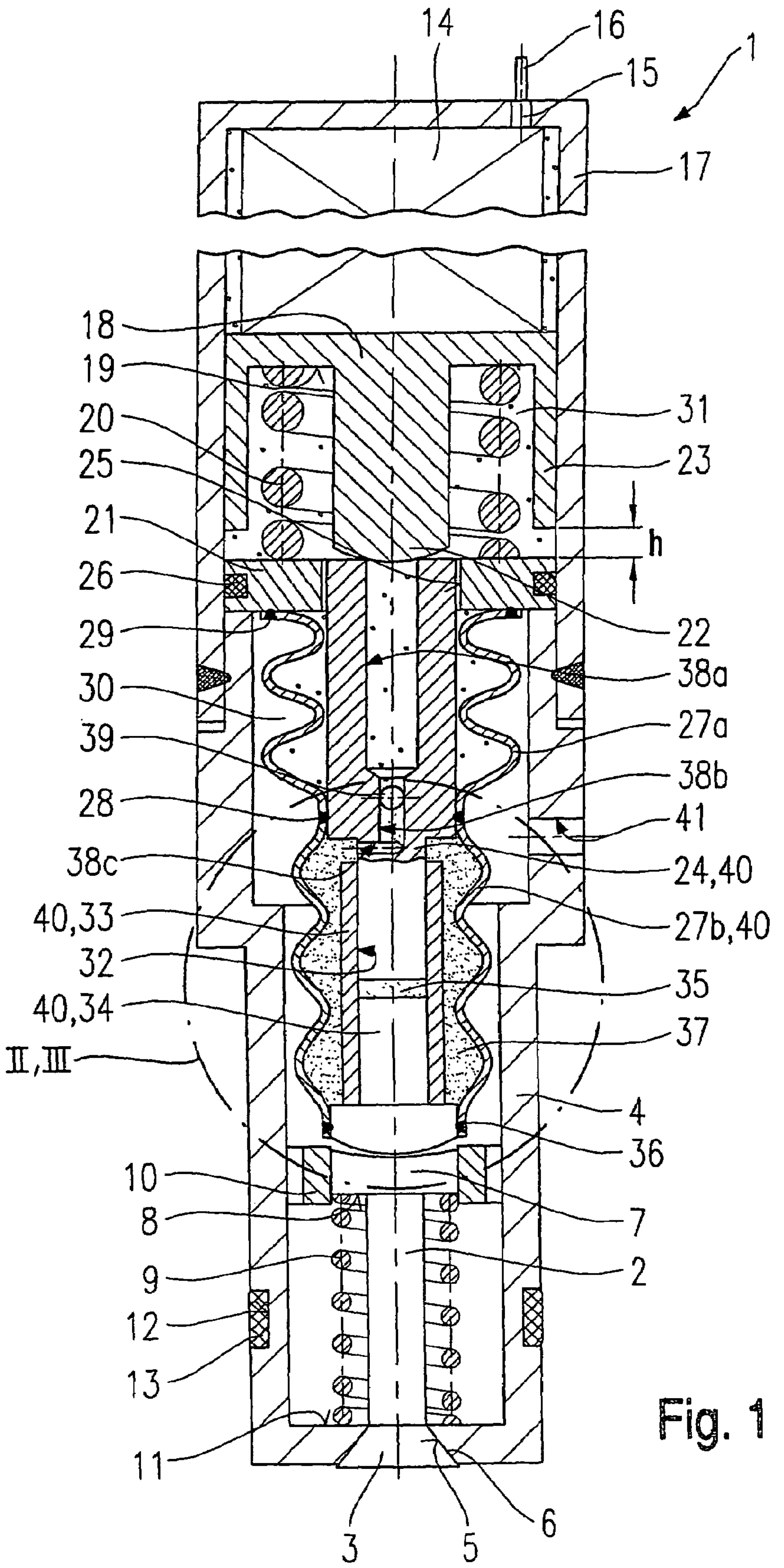
FIG. 1 shows a schematic section through an exemplary embodiment of a fuel injector configured according to the present invention.

Fuel injector 1, schematically shown in FIG. 1, has a valve needle 2, which is joined to a valve-closure member 3 and cooperates via this valve-closure member 3 with a valve-seat surface 5 formed in a valve member 4 to form a valve-sealing seat. Fuel injector 1 is an outwardly opening fuel injector, which is provided with a valve needle 2 that opens toward the outside. Valve needle 2 is guided in a valve-needle guide 10 by a guide section 7, which includes a spring system 8 for a valve-closure spring 9. Valve-closure spring 9 is braced against a second spring system 11 at valve body 4 and prestresses valve needle 2 with a force that presses valve-closure member 3 against valve-seat surface 5. A sealing ring 13 positioned in a groove 12 seals the ring gap (not shown here) between valve body 4 and a bore (likewise not shown) in a cylinder head of an internal combustion engine.

To actuate valve needle 2, a piezoelectric or magnetostrictive actuator 14, to which a voltage may be supplied via a bore 15 in valve-body upper section 17 and an electrical supply line 16, is positioned in a valve-body upper section 17. Actuator 14 has a larger overall length so as to obtain a perceptible lift in response to a voltage being applied to actuator 14. The largest part of the overall length of actuator 14 is not shown in FIG. 1. Adjoining actuator 14 is an actuator head 18, which has a spring contact surface 19 against which an actuator tension spring 20 rests, which in turn is braced against a partition disk 21. Actuator spring 20 applies an inital stress to actuator 14, so that, in response to a voltage being applied to electrical supply line 16, the lift of actuator 14 is transmitted to actuator head 18. Formed on actuator head 18 is a pressure tappet 22, which is integrally formed with actuator head 18 and transmits the lift of actuator 14. Actuator head 18 is guided in valve-body upper section 17 by an actuator-head sleeve 23 and, following a maximum valve travel h, this actuator-head sleeve 23 strikes against partition disk 21. This restricts maximal valve travel h of actuator 14 and, consequently, the maximal valve travel of valve needle 2 as well.

Actuator-head tappet 22 transmits the lift movement of actuator 14 to a master piston 24. Master piston 24 is guided by a guide bore 25 penetrating carrier disk 21. Carrier disk 21 is sealed from valve-body upper section 17 by a sealing ring 26. A first section of a corrugated tube **27*a* concentrically encloses master piston 24 and is affixed on master piston 24 by a welding seam 28. On the other side, corrugated tube 27*a* is attached to carrier disk 21 by a welded seam 29**.

In response to a lift of actuator 14 and a resultant movement of actuator head 18 having actuator-head tappet 22 formed thereon, master piston 24 is moved in the longitudinal direction, the first section of corrugated tube **27*a* following this movement and expanding correspondingly. At the same time, corrugated tube 27*a*, which, by welded seams 28 and 29, has sealed ends with respect to master piston 24 and carrier disk 21, seals a fuel chamber 30 from an actuator chamber 31**.

Master piston 24 is guided in a guide bore 32 in a guide sleeve 33. A slave piston 34 is located in the same guide bore 32 oppositely to master piston 24, and a pressure chamber 35 is situated between master piston 24 and slave piston 34. Surrounding guide sleeve 33 is a second section of corrugated tube **27*b* which, due to a low wall thickness, is easily radially deformable relative to an imaginary longitudinal axis of fuel injector 1. Corrugated tube 27*b* is sealingly connected to master piston 24 via welded seam 28, and to slave piston 34 via a welded seam 36, thereby sealing a supply chamber 37 filled with an hydraulic fluid from fuel chamber 30. Used as an hydraulic fluid is a silicon oil, for instance, which may easily be optimized for a desired viscosity. The side of slave piston 34 facing valve needle 2 has a hemispherical form and rests on a conical surface of valve needle 2 in order to compensate for positional tolerances between slave piston 34 and valve needle 2. Master piston 24, guide sleeve 33, slave piston 34 and the lower section of corrugated tube 27*b* form hydraulic coupler 40**.

A connection between actuator chamber 31 and supply chamber 37 is established via filling bores **38*a*, 38*b*, 38*c* in master piston 24. This connection is sealed in a pressure-tight manner by a pressed-in ball 39 in filling bore 38*b*. Actuator chamber 31 is also filled with silicon oil, which is used to reduce the friction of actuator 14 at valve-body upper section 17 and to cool actuator 14. As a result of ball 39 sealing filling bore 38*b* in a pressure-tight manner, actuator chamber 31** is nonpressurized.

The fuel flows into fuel chamber 30 via a fuel-inflow bore 41.

If a voltage is applied to actuator 14 via electric line 16, actuator 14 expands in the longitudinal direction of fuel injector 1 and pushes actuator head 18 with actuator tappet 22 formed thereon in the direction of valve seat 6. Following a path h, the stop of actuator-head sleeve 23 at carrier disk 21 restricts the lift. The movement is transmitted to master piston 24. The silicon oil contained in pressure chamber 35 is virtually incompressible as fluid and, thus, transmits the movement to slave piston 34.

Valve needle 2, lifting off from valve-sealing seat 6, opens toward the outside. During the lift, only a gap-loss quantity of silicon oil can escape from pressure chamber 35 into supply chamber 37 through the ring gap between master piston 24 and guide bore 32 and between slave piston 34 and guide bore 32.

At the conclusion of the lift, the actuator is pushed back by actuator spring 20, and valve-needle spring 9 presses valve needle 2 into its valve-sealing seat 6. Due to the initial stress of the second section of corrugated tube **27*b*, slave piston 34 and master piston 24 are pulled out of guide bore 32, thereby increasing the volume of pressure chamber 35. Via the ring gap, silicon oil continues to flow from supply chamber 37 until slave piston 34 abuts against valve needle 2. The first section of corrugated tube 27***a*, which is pre-stressed, keeps pressure piston 24 in contact against actuator-head tappet 22.

In an advantageous manner, fuel injector 1 configured according to the present invention and having the described transmission path of the lifting force from actuator 14 to valve needle 2, thus automatically adjusts to the expansions of valve body 4 in response to fluctuations in the fuel pressure. Temperature-related expansions are compensated as well. Due to the high viscosity of the silicon oil, large tolerances and, thus, gap measures, may be permitted. As a result of the design of fuel injector 1 according to the present invention, an advantageous manufacture is possible and, in particular, a filling of coupler 40 with silicon oil without gas bubbles is present. Before actuator 14 and valve-body upper section 17 are mounted, virtually all gas may be removed from coupler 40 by evacuation. Once coupler 40 has been filled with silicon oil, the coupler is sealed by ball 39 being forced in. A sufficient quantity of silicon oil may already have been filled in for the pressure-free filling of actuator chamber 14. Actuator 14 will then be mounted.

Furthermore, a failure of fuel injector 1 due to the evaporation of fuel can advantageously be prevented, since coupler 40 is filled with silicon oil.

Figure 2:
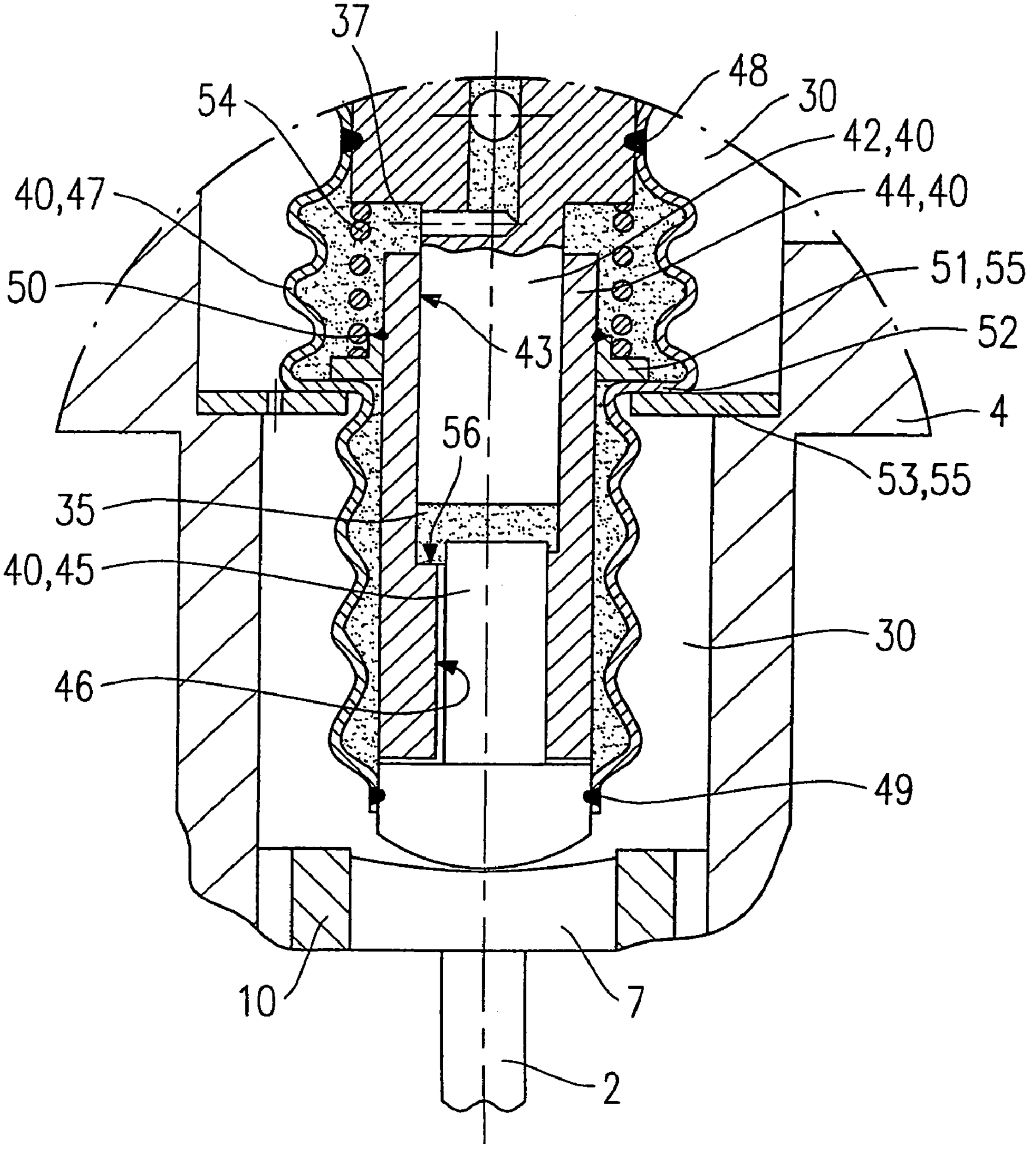
FIG. 2 shows a schematic section through an additional exemplary embodiment of a fuel injector configured according to the present invention, in a detail corresponding to the cut-away portion II of FIG. 1.

FIG. 2 shows a schematic section through an additional exemplary embodiment of a fuel injector configured according to the present invention. The exemplary embodiment deviates from that of the fuel injector shown in FIG. 1 only in the region of the detail designated II in FIG. 1. Therefore, to avoid repetitions, the representation is restricted to this detail. Identical components are provided with matching reference numerals.

Inserted in valve body 4 is valve-needle guide 10 through which valve needle 2 is guided by way of its guide section 7. A master piston 42 is guided in a guide bore 43 of a guide sleeve 44 and has a larger diameter than a slave piston 45, which is likewise guided in a guide bore 46 of guide sleeve 44. Situated around guide sleeve 44 is a section of corrugated tube 47, which is radially easily deformable due to reduced wall thickness. Corrugated tube 47 is sealingly connected to master piston 42 via a welded seam 48, and to slave piston 45 via a welded seam 49, thereby sealing supply chamber 37 from fuel chamber 30, which is filled with silicon oil. The side of slave piston 45 facing valve needle 2 has a hemispherical form and rests on a conical surface of guide section 7 of valve needle 2 in order to compensate for positional tolerances between slave piston 45 and valve needle 2. Master piston 42, guide sleeve 44, slave piston 45 and the lower section of corrugated tube 47 form hydraulic coupler 40. Coupler 40 is shown in an embodiment with lift translation. Master piston 42 has a larger diameter than slave piston 45 and, thus, has a larger effective area with respect to pressure chamber 35. Via a welded seam 50, a support ring 51 is joined to guide sleeve 44. Support ring 51, via a convolution 52 of corrugated tube 47, abuts against a carrier ring 53 and is held in contact by a compression spring 54. Carrier ring 53 is perforated by overflow channels 56 for the fuel. Support ring 51 and supporting ring 53 form a torque support 55.

In this embodiment, the lift of actuator 14 may be translated into a greater actuator travel of valve needle 2 in an advantageous manner. Due to the smaller diameter of slave piston 45, however, an effective area 56 of guide sleeve 44 remains, which in the event of a pressure increase in pressure chamber 30 leads to guide sleeve 44 following the movement of slave piston 45. Owing to torque support 55, the pressure force is diverted to this effective area 56 of guide sleeve 44. However, the torque support may also be implemented in some other manner, as long as supply chamber 37 is sealed from fuel chamber 30 and the movement of corrugated tube 47 is not unduly restricted. This may be achieved by spot heat sealing, for instance, or a clamping connection between valve body 4 and corrugated tube 47 and between corrugated tube 47 and guide sleeve 44.

Figure 3:
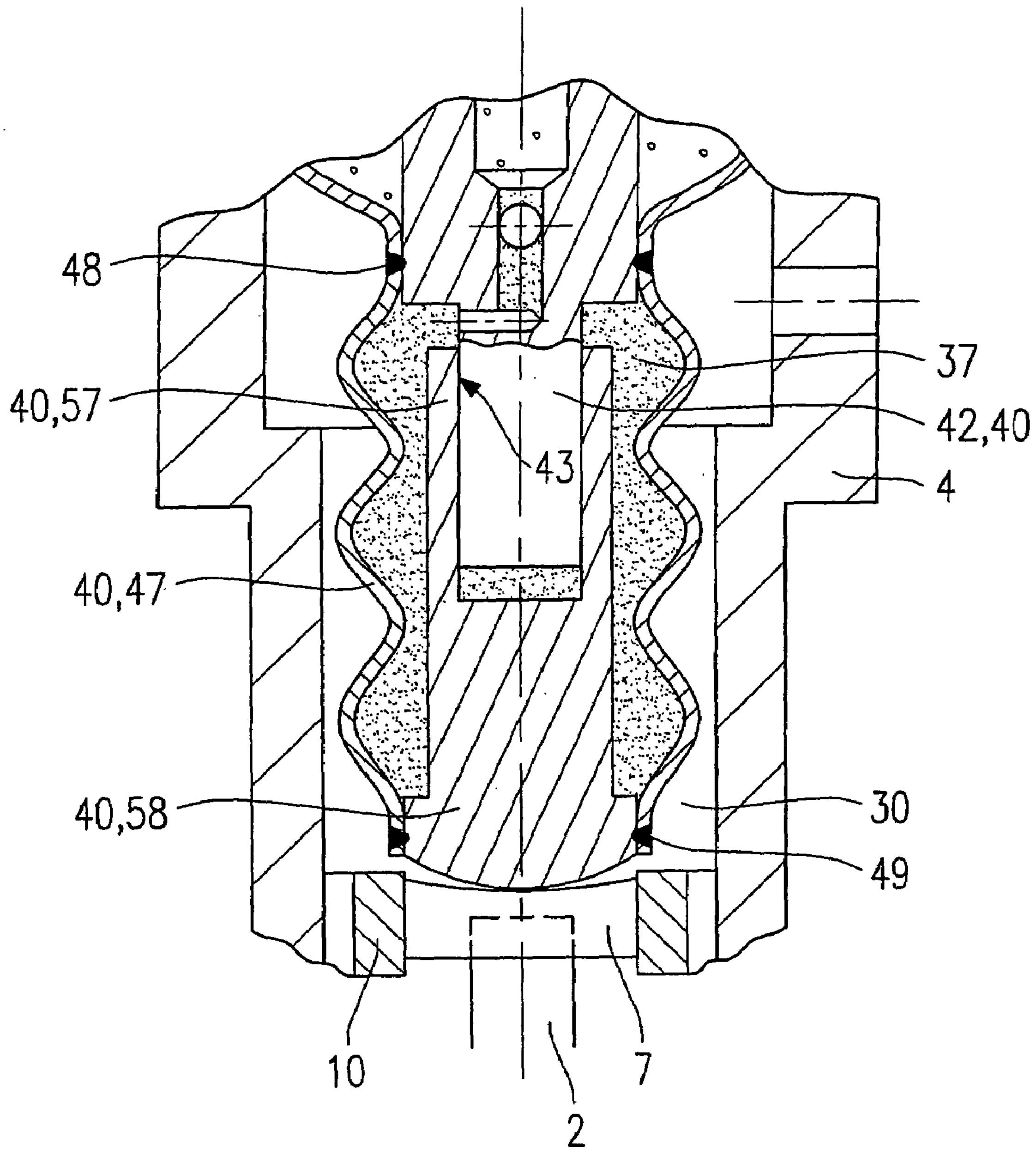
FIG. 3 shows a schematic section through an additional exemplary embodiment of a fuel injector configured according to the present invention, in a detail corresponding to the cut-away portion III of FIG. 1.

FIG. 3 shows a schematic section through an additional exemplary embodiment of a fuel injector configured according to the present invention. The exemplary embodiment deviates from the fuel injector shown in FIG. 1 only in the region of the detail designated III in FIG. 1. In order to avoid repetition, the representation is restricted to this detail. Identical components bear matching reference numerals.

Inserted in valve body 4 is a valve-needle guide 10 through which valve needle 2 is guided by way of its guide section 7. A master piston 42 is guided in a guide bore 43 of a guide sleeve 57, which is integrally formed with a slave piston 58. Situated around guide sleeve 57 is a section of corrugated tube 47, which is radially easily deformable due to a low wall thickness. Corrugated tube 47 is sealingly connected to master piston 42 via welded seam 48, and to slave piston 45 via a welded seam 49, thereby sealing a supply chamber 37 from fuel chamber 30, which is filled with silicon oil. The side of slave piston 58 facing valve needle 2 has a hemispherical form and rests on a conical surface of guide section 7 of valve needle 2 in order to compensate for positional tolerances between slave piston 58 and valve needle 2. Master piston 42, guide sleeve 57, slave piston 58 and the lower section of corrugated tube 47 form hydraulic coupler 40.

In an advantageous manner, an additional component and a sealing fit are saved by this embodiment in that guide sleeve 57 and slave piston 58 are integrally formed.

In a method of manufacturing a fuel injector having filling bores in the master piston, the supply chamber being connected to an actuator chamber and the sealing element being a ball pressed into one of the filling bores, the pressure chamber and the supply chamber of the coupler, in a first step, are evacuated via the filling bores by suitable manufacturing devices. In a second step, the coupler is filled with an hydraulic fluid, and in a third step, a ball is pressed into an accessible filling bore.

In this manner, an advantageous filling of the coupler, free of gas bubbles, may be achieved before the actuator is installed.

What is claimed is:

1. A fuel injector for a fuel injection system of an internal combustion engine, comprising:

a piezoelectric or magnetostrictive actuator;

a valve closure member formed on a valve needle, the valve closure member cooperating with a valve seat surface to form a valve sealing seat;

a hydraulic coupler, the actuator configured to actuate the valve-closure member via the coupler, the coupler including a master piston and a slave piston, which are guided in bores of a guide sleeve, and a pressure chamber filled with a hydraulic fluid located between the master piston and the slave piston; and a corrugated tube positioned around the guide sleeve and sealingly joined to the master piston at one end and to the slave piston at the other end, the corrugated tube sealing seal a supply chamber for the hydraulic fluid from a surrounding fuel chamber, wherein:

the corrugated tube is radially yielding, and the corrugated tube has a reduced wall thickness and is flexurally soft due to the wall thickness.

2. The fuel injector as recited in claim 1, wherein the corrugated tube is joined to the master piston and the slave piston in force locking manner.

3. The fuel injector as recited in claim 2, wherein the corrugated tube has an initial stress which forces the master piston and the slave piston apart.

4. The fuel injector as recited in claim 1, wherein the master piston and the slave piston have different diameters.

5. The fuel injector as recited in claim 1, wherein a lift of the actuator is restricted by a stop.

6. A fuel injector for a fuel injection system of an internal combustion engine, comprising:

a piezoelectric or magnetostrictive actuator;

a valve closure member formed on a valve needle, the valve closure member cooperating with a valve seat surface to form a valve sealing seat;

a hydraulic coupler, the actuator configured to actuate the valve-closure member via the coupler, the coupler including a master piston and a slave piston, which are guided in bores of a guide sleeve, and a pressure chamber filled with a hydraulic fluid located between the master piston and the slave piston; and a corrugated tube positioned around the guide sleeve and sealingly joined to the master piston at one end and to the slave piston at the other end, the corrugated tube sealing seal a supply chamber for the hydraulic fluid from a surrounding fuel chamber, wherein the slave piston and the guide sleeve are integrally formed.

7. A fuel injector for a fuel injection system of an internal combustion engine, comprising:

a piezoelectric or magnetostrictive actuator;

a valve closure member formed on a valve needle, the valve closure member cooperating with a valve seat surface to form a valve sealing seat;

a hydraulic coupler, the actuator configured to actuate the valve-closure member via the coupler, the coupler including a master piston and a slave piston, which are guided in bores of a guide sleeve, and a pressure chamber filled with a hydraulic fluid located between the master piston and the slave piston; and a corrugated tube positioned around the guide sleeve and sealingly joined to the master piston at one end and to the slave piston at the other end, the corrugated tube sealing seal a supply chamber for the hydraulic fluid from a surrounding fuel chamber, wherein:

a lift of the actuator is restricted by a stop, and the stop is formed on an actuator head.

8. A fuel injector for a fuel injection system of an internal combustion engine, comprising:

a piezoelectric or magnetostrictive actuator;

a valve closure member formed on a valve needle, the valve closure member cooperating with a valve seat surface to form a valve sealing seat;

a hydraulic coupler, the actuator configured to actuate the valve-closure member via the coupler, the coupler including a master piston and a slave piston, which are guided in bores of a guide sleeve, and a pressure chamber filled with a hydraulic fluid located between the master piston and the slave piston; and a corrugated tube positioned around the guide sleeve and sealingly joined to the master piston at one end and to the slave piston at the other end, the corrugated tube sealing seal a supply chamber for the hydraulic fluid from a surrounding fuel chamber, wherein:

a lift of the actuator is restricted by a stop, and the corrugated tube is integrally formed with a corrugated tube for sealing an actuator chamber from a fuel chamber which has a reduced wall thickness in a region of the coupler.

9. A fuel injector for a fuel injection system of an internal combustion engine, comprising:

a piezoelectric or magnetostrictive actuator;

a valve closure member formed on a valve needle, the valve closure member cooperating with a valve seat surface to form a valve sealing seat;

a hydraulic coupler, the actuator configured to actuate the valve-closure member via the coupler, the coupler including a master piston and a slave piston, which are guided in bores of a guide sleeve, and a pressure chamber filled with a hydraulic fluid located between the master piston and the slave piston; and a corrugated tube positioned around the guide sleeve and sealingly joined to the master piston at one end and to the slave piston at the other end, the corrugated tube sealing seal a supply chamber for the hydraulic fluid from a surrounding fuel chamber, wherein a filling channel is provided in at least one of the master piston and the slave piston, the channel connecting the supply chamber to a surrounding chamber of the coupler, the filling channel sealed in a pressure tight manner by a sealing element.

10. The fuel injector as recited in claim 9, wherein the filling channel is formed in the master piston by filling bores and connects the supply chamber to an actuator chamber.

11. The fuel injector as recited in claim 10, wherein the sealing element is a ball pressed into one of the filling bores.

* * * * *